(12) United States Patent
Jeong et al.

(10) Patent No.: US 12,269,317 B2
(45) Date of Patent: Apr. 8, 2025

(54) COMPRESSOR CONTROL METHOD FOR VEHICLE

(71) Applicants: Hyundai Motor Company, Seoul (KR); Kia Corporation, Seoul (KR)

(72) Inventors: Jae-Eun Jeong, Hwaseong-si (KR); Wan Je Cho, Hwaseong-si (KR); Tae Hee Kim, Ansan-si (KR); Hyunjae Lee, Seongnam-si (KR); Namho Park, Suwon-si (KR); Seong-Bin Jeong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 267 days.

(21) Appl. No.: 17/967,574

(22) Filed: Oct. 17, 2022

(65) Prior Publication Data

US 2023/0398837 A1    Dec. 14, 2023

(30) Foreign Application Priority Data

May 18, 2022   (KR) .................. 10-2022-0060566

(51) Int. Cl.
*B60H 1/00*   (2006.01)
(52) U.S. Cl.
CPC ..... *B60H 1/00978* (2013.01); *B60H 1/00899* (2013.01)
(58) Field of Classification Search
CPC ............ B60H 1/00978; B60H 1/00899; B60H 2001/3272; B60H 2001/3248; B60H 2001/3255; B60H 2001/325; B60H 2001/327; B60H 2001/3205; F25B 2700/1931; F25B 2700/21154
See application file for complete search history.

(56) References Cited

U.S. PATENT DOCUMENTS

| | | | |
|---|---|---|---|
| 5,316,074 A * | 5/1994 | Isaji .................. | B60H 1/00878 62/323.3 |
| 2006/0118290 A1 * | 6/2006 | Klassen ............. | B60H 1/00828 165/202 |
| 2010/0172765 A1 * | 7/2010 | Shibuya ................ | F04B 49/065 417/44.11 |
| 2012/0234030 A1 * | 9/2012 | Hagita .................. | F25B 49/025 62/129 |
| 2019/0092134 A1 * | 3/2019 | Vehr ..................... | B60H 1/3222 |
| 2021/0318046 A1 * | 10/2021 | Kikuchi .................. | F25B 13/00 |
| 2022/0397323 A1 * | 12/2022 | Yamakawa ........... | F25B 49/022 |

* cited by examiner

*Primary Examiner* — Marc E Norman
(74) *Attorney, Agent, or Firm* — Slater Matsil, LLP

(57) ABSTRACT

An embodiment method for controlling a compressor of a vehicle includes selectively controlling an operation of the compressor by determining and comparing a discharge pressure of the compressor and a temperature of an inverter with predetermined values based on data detected in real time when the compressor is operated to cool or heat an interior of the vehicle and operating a protection mode to prevent thermal burnout of the inverter in response to a determination that the discharge pressure of the compressor is higher than an operation stop pressure.

20 Claims, 3 Drawing Sheets

COMPRESSOR CONTROL METHOD FOR VEHICLE

CROSS-REFERENCE TO RELATED APPLICATIONS

This application claims the benefit of Korean Patent Application No. 10-2022-0060566, filed on May 18, 2022, which application is hereby incorporated herein by reference.

TECHNICAL FIELD

The present invention relates to a compressor control method for a vehicle.

BACKGROUND

Generally, an air conditioning system for a vehicle includes an air conditioner unit circulating a refrigerant in order to heat or cool an interior of the vehicle.

The air conditioner unit, which is to maintain the interior of the vehicle at an appropriate temperature regardless of a change in an external temperature to maintain a comfortable interior environment, is configured to heat or cool the interior of the vehicle by heat-exchange by a condenser and an evaporator in a process in which a refrigerant discharged by driving of a compressor is circulated back to the compressor through the condenser, a receiver drier, an expansion valve, and the evaporator.

That is, the air conditioner unit lowers a temperature and humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode in summer.

Meanwhile, recently, in accordance with a continuous increase in interest in energy efficiency and an environmental pollution problem, the development of an environmentally friendly vehicle capable of substantially substituting for an internal combustion engine vehicle is required, and the environmentally friendly vehicle is classified into an electric vehicle driven using a fuel cell or electricity as a power source and a hybrid vehicle driven using an engine and a battery.

In the electric vehicle or the hybrid vehicle among these environmentally friendly vehicles, a separate heater is not used, unlike an air conditioner of a general vehicle, and an air conditioner used in the environmentally friendly vehicle is generally called a heat pump system.

Here, in the heat pump system applied to the electric vehicle, temperature management is essential to prevent failure and breakage of the compressor, and conventionally, a temperature is managed through operation control of the compressor.

In addition, the inverter provided inside the compressor is cooled by using refrigerant inflowed to the compressor.

That is, in the conventional heat pump system, when the refrigerant pressure is greater than or equal to a predetermined pressure, or when the refrigerant temperature is greater than a predetermined temperature, to prevent a malfunction and damage of the compressor, an operation revolutions per minute (RPMs) of the compressor is simply lowered, or on/off control of the compressor is performed.

However, in a conventional compressor control method as described above, when the operation RPMs of the compressor is lowered, since it is difficult to secure a sufficient flow rate of the refrigerant, there is a problem in that the cooling of the inverter is insufficient and heat damage of the inverter occurs.

In addition, as heat damage of the inverter is accumulated due to the frequent on-off control of the compressor, the inverter may be permanently damaged, and in this case, there is also a problem that the heat pump system does not operate due to the inoperability of the compressor.

In addition, if the inverter is permanently damaged and burned, the compressor must be replaced, which also includes problems such as increased maintenance costs.

The above information disclosed in this background section is only for enhancement of understanding of the background of embodiments of the invention, and therefore it may contain information that does not form the prior art that is already known to a person of ordinary skill in the art.

SUMMARY

The present invention relates to a compressor control method for a vehicle. Particular embodiments relate to a compressor control method for a vehicle that prevents a failure and damage due to heat in a compressor operated to perform indoor cooling or heating of an electric vehicle in advance.

Therefore, embodiments of the present invention can solve problems in the art, and embodiments of the present invention provide a compressor control method for a vehicle that prevents failure and damage of the compressor in advance by preventing heat damage from occurring in the inverter provided in the compressor operated to perform the indoor cooling or heating of the vehicle in the electric vehicle.

A compressor control method for a vehicle according to an exemplary embodiment of the present invention may include a process (A) of selectively controlling an operation of a compressor by a controller by comparing and determining a discharge pressure of the compressor and a temperature of the inverter with predetermined values based on data detected in real time from a data detection unit, respectively, if the compressor is operated to cool or heat an interior of a vehicle, and a process (B) of operating a protection mode to prevent a thermal burnout of the inverter if the controller determines that a discharge pressure of the compressor is higher than an operation stop pressure through the process (A).

The process (A) may include driving the compressor according to an indoor cooling or heating demand of the vehicle of the user, determining whether the discharge pressure of the compressor is higher than the operation stop pressure by the controller based on the data detected from the data detection unit, determining whether the temperature of the inverter is higher than the operation stop temperature by the controller if it is determined that the discharge pressure of the compressor is not higher than the operation stop pressure (i.e., if the condition is not satisfied), and stopping the operation of the compressor by the controller if it is determined that the temperature of the inverter is higher than the operation stop temperature (i.e., the condition is satisfied).

The process (A) may include determining whether the discharge pressure of the compressor is smaller than the operation release pressure and the temperature of the inverter is smaller than the operation release temperature if the operation of the compressor is stopped by the controller and restarting the compressor by the controller if it is determined that the discharge pressure of the compressor is smaller than the operation release pressure and the temperature of the inverter is smaller than the operation release temperature (i.e., the condition is satisfied).

In the determining whether the discharge pressure of the compressor is smaller than the operation release pressure and the temperature of the inverter is smaller than the operation release temperature by the controller, if it is determined that the discharge pressure of the compressor is higher than the operation release pressure and the temperature of the inverter is higher than the operation release temperature (i.e., the condition is not satisfied), the controller may be returned to the stopped condition of the operation of the compressor.

If the restarting of the compressor is completed, the controller may be returned to determining whether the discharge pressure of the compressor is higher than the operation stop pressure based on the data detected from the data detection unit.

The process (B) may include lowering RPMs of the compressor by the controller if it is determined that the discharge pressure of the compressor is higher than the operation stop pressure (i.e., the condition is satisfied), determining whether the temperature change rate of the inverter calculated on the basis of the data detected from the data detection unit is higher than a predetermined change rate by the controller, limiting the current value applied to the compressor by the controller if it is determined that the temperature change rate of the inverter is higher than the predetermined change rate (i.e., the condition is satisfied), setting the operation stop temperature and the operation release temperature of the inverter to be lowered, respectively, by the controller, determining whether the temperature of the inverter is higher than the lowered operation stop temperature by the controller, and operating the protection mode by the controller if it is determined that the temperature of the inverter is higher than the lowered operation stop temperature (i.e., the condition is satisfied).

The protection mode may include stopping the operation of the compressor by the controller, counting an operation stopping number of the compressor by the controller, determining whether the counted operation stopping number of the compressor is equal to a predetermined number by the controller, and stopping the operation of the compressor and generating an error code by the controller if it is determined that the operation stopping number of the compressor is the same as the predetermined number (i.e., the condition is satisfied).

The protection mode may further include determining whether the temperature of the inverter is lower than the lowered operation release temperature by the controller if it is determined that the operation stopping number of the compressor is not equal to the predetermined number (i.e., if the condition is not satisfied) and restarting the compressor by the controller if it is determined that the temperature of the inverter is lower than the lowered operation release temperature (i.e., the condition is satisfied).

In determining whether the temperature of the inverter is lower than the lowered operation release temperature by the controller, if it is determined that the temperature of the inverter is higher than the lowered operation release temperature (i.e., the condition is not satisfied), the controller may be returned to determining whether the counted operation stopping number of the compressor is equal to the predetermined number.

If the compressor is restarted, the controller may be returned to lowering the RPMs of the compressor.

The predetermined number may be three.

In determining whether the temperature change rate of the inverter calculated on the basis of the data detected from the data detection unit is higher than the predetermined change rate by the controller, and if it is determined that the temperature change rate of the inverter is lower than the predetermined change rate (i.e., the condition is not satisfied), the controller may be returned to determining whether the temperature of the inverter is higher than the operation stop temperature in the process (A).

In determining whether the temperature of the inverter is higher than the lowered operation stop temperature by the controller, and if it is determined that the temperature of the inverter is lower than the lowered operation stop temperature (i.e., the condition is not satisfied), the controller may be returned to lowering the RPMs of the compressor.

In setting the operation stop temperature of the inverter and the operation release temperature to be lowered, the controller may set the initially predetermined operation stop temperature of the inverter to be lowered by 10° C. and set the initially predetermined operation release temperature of the inverter to be lowered by 20° C.

The data detection unit may include a pressure sensor measuring the discharge pressure of the compressor and a temperature sensor measuring the temperature of the inverter.

The processes (A) and (B) may be reset when the operation of the vehicle is terminated.

As above-described, according to the compressor control method for the vehicle according to an exemplary embodiment of the present invention, by preventing the thermal damage from occurring in the inverter provided in the compressor operated to cool or heat the interior of the electric vehicle, it is possible to prevent the failure of and damage to the compressor in advance.

In addition, embodiments of the present invention prevent the accumulation of heat damage and heat stress of the inverter when it is difficult to secure a sufficient flow rate of refrigerant, thereby preventing the permanent damage and failure of the compressor in advance.

Furthermore, embodiments of the present invention may improve the durability and lifespan of the compressor, reduce maintenance costs, and improve overall marketability of electric vehicles.

DETAILED DESCRIPTION OF ILLUSTRATIVE EMBODIMENTS

Exemplary embodiments of the present invention will hereinafter be described in detail with reference to the accompanying drawings.

Exemplary embodiments described in the present specification and configurations shown in the accompanying drawings are only exemplary embodiments of the present invention and do not illustrate the entire scope of the present invention. Therefore, it is to be understood that various equivalents and modifications may replace exemplary embodiments described in the present specification and configurations shown in the accompanying drawings.

In addition, unless explicitly described to the contrary, the word "comprise", and variations such as "comprises" or "comprising", will be understood to imply the inclusion of stated elements but not the exclusion of any other elements.

Figure 1:
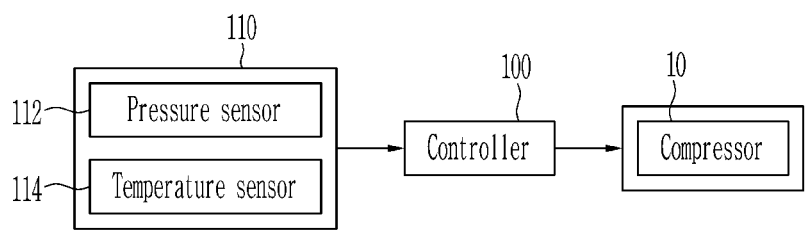
FIG. 1 is a block diagram showing a compressor control apparatus applied to a compressor control method for a vehicle according to an exemplary embodiment of the present invention.
Figure 2A:
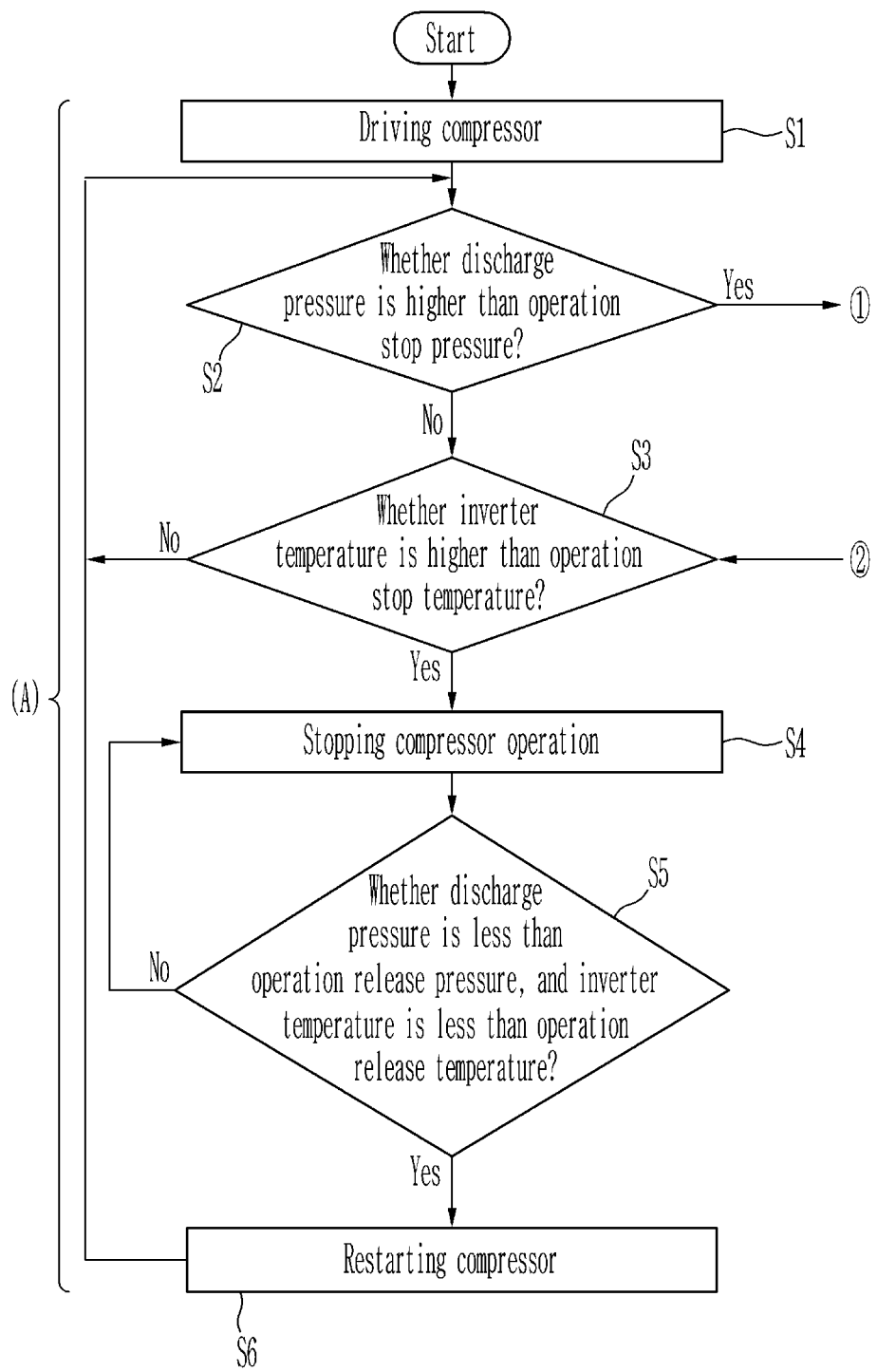
FIGS. 2A and 2B are control flowcharts to explain a compressor control method for a vehicle according to an exemplary embodiment of the present invention.
Figure 2B:
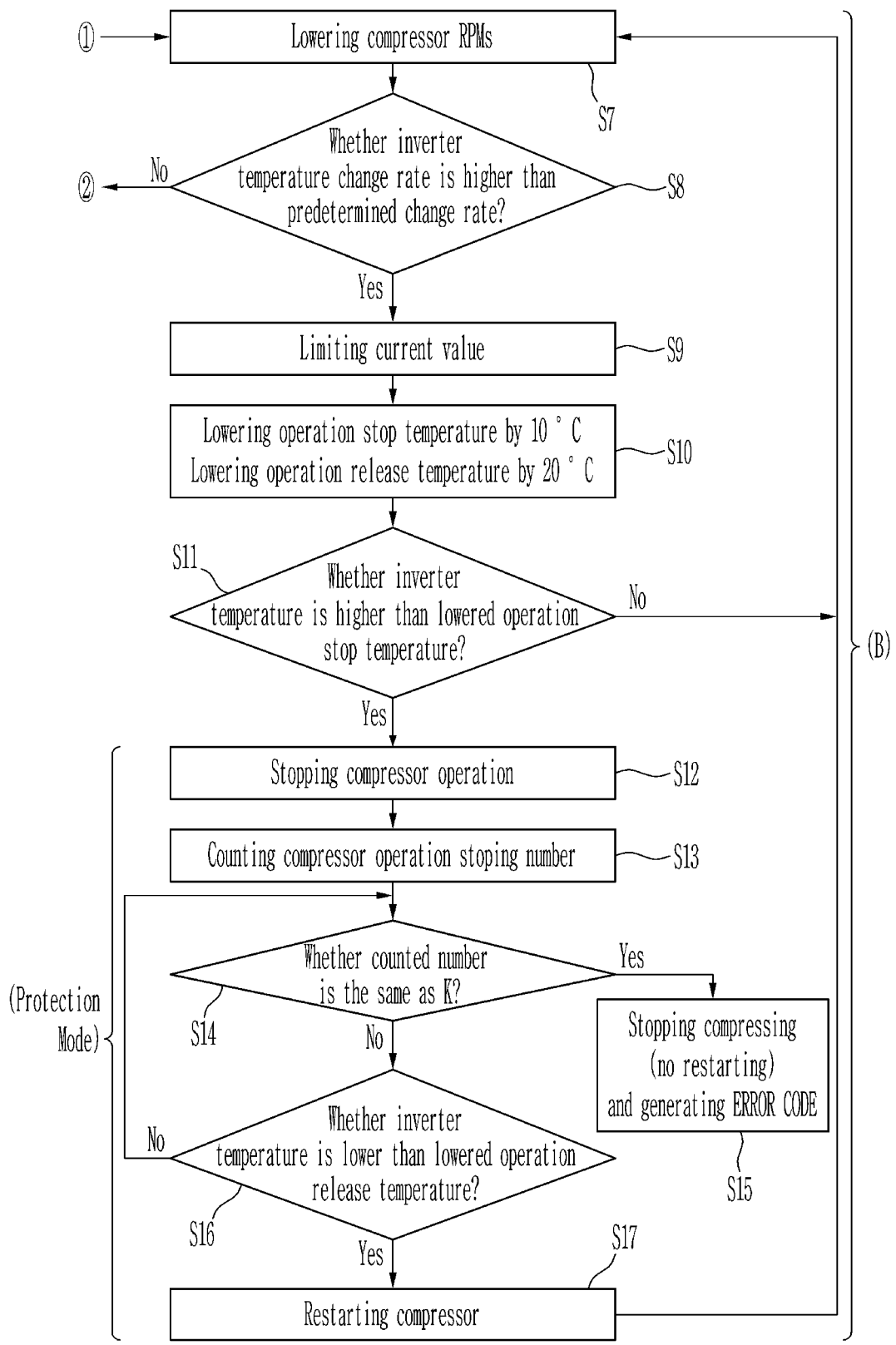

FIG. 1 is a block diagram showing a compressor control apparatus applied to a compressor control method for a vehicle according to an exemplary embodiment of the present invention, and FIG. 2, which includes FIGS. 2A and 2B, is a control flowchart to explain a compressor control method for a vehicle according to an exemplary embodiment of the present invention.

Referring to the accompanying drawings, a compressor control method for a vehicle according to an exemplary embodiment of the present invention is controlled by the controller 100, and is applied to an electric vehicle to which a heat pump system including a compressor 10 is applied.

Here, the compressor 10 may include an inverter provided therein and may be controlled by a compressor control apparatus, and the compressor control apparatus may include a controller 100 and a data detection unit no.

Here, the data detection unit no may detect data for preventing failure and damage to the compressor 10 in advance.

The data detected by the data detection unit no is transmitted to the controller 100. The data detection unit no may include a pressure sensor 112 and a temperature sensor 114.

First, the pressure sensor 112 may measure the discharge pressure of the refrigerant discharged from the compressor 10 and transmit a signal for this to the controller 100.

The temperature sensor 114 may measure the temperature of the inverter provided in the compressor 100 and transmit a signal for this to the controller 100.

The controller 100 may determine whether overheating due to the accumulation of thermal impact and thermal stress applied to the inverter provided in the compressor 10 based on the data detected by the data detection unit 110 occurs.

In addition, the controller 100 may determine whether the inverter is overheated and control whether the compressor 10 operates to prevent the thermal damage of the inverter and the failure and damage of the compressor 10 due to a permanent burnout.

That is, the compressor control method for the vehicle according to an exemplary embodiment of the present invention prevents the heat damage from occurring in the inverter provided in the compressor 10 that is operated to perform the indoor cooling or heating of the vehicle in the electric vehicle, thereby it is possible to prevent the occurrence of the failure and damage of the compressor 10 in advance.

For this, the compressor system control method for the vehicle according to an exemplary embodiment of the present invention, as shown in FIG. 2, includes a process (A) in which the controller 100 compares and determines the discharge pressure of the compressor 10 and the temperature of the inverter with predetermined values based on the data detected in real time from the data detection unit 110, respectively, when the compressor 10 is operated to cool or heat the interior of the vehicle to selectively control the operation of the compressor 10, and a process (B) of operating a protection mode to prevent heat loss of the inverter when the controller 100 determines that the discharge pressure of the compressor 10 is higher than an operation stop pressure through the process (A).

In the present exemplary embodiment, the process (A) illustrated in FIG. 2A may include the following steps.

First, the compressor is driven according to the indoor cooling or heating demand of the vehicle of the user (S1). Then, the refrigerant circulates in the heat pump system.

In this state, the controller 100 determines whether the discharge pressure of the compressor 10 is higher than the operation stop pressure based on the data detected from the data detection unit 110 (S2).

If it is determined that the discharge pressure of the compressor 10 is not higher than the operation stop pressure (i.e., if the condition is not satisfied), the controller 100 determines whether the temperature of the inverter is higher than the operation stop temperature (S3).

Here, if it is determined that the temperature of the inverter is higher than the operation stop temperature (i.e., if the condition is satisfied), the controller 100 stops the operation of the compressor 10 (S4).

Then, when the operation of the compressor 10 is stopped, the controller 100 determines whether the discharge pressure of the compressor 10 is less than the operation release pressure, and the temperature of the inverter is less than the operation release temperature (S1).

Here, when it is determined that the discharge pressure of the compressor 10 is less than the operation release pressure, and the temperature of the inverter is less than the operation release temperature (i.e., if the condition is satisfied), the controller 100 may restart the compressor 10 (S6).

When the restarting (S6) of the compressor 10 is completed, the controller 100 may be returned to determine whether the discharge pressure of the compressor 10 is higher than the operation stop pressure based on the data detected from the data detection unit no (S2).

On the other hand, in the step (S5) in which the controller 100 determines whether the discharge pressure of the compressor 10 is less than the operation release pressure, and the temperature of the inverter is less than the operation release temperature, if it is determined that the discharge pressure of the compressor 10 is not less than the operation release pressure or the temperature of the inverter is not less than the operation release temperature (i.e., if the condition is not satisfied), the controller 100 may be returned to the step (S4) of stopping the operation of the compressor 10.

While performing the process (A) as described above, the controller 100 may also perform the process (B) according to the condition.

The process (B) illustrated in FIG. 2B may include following steps.

First, in the step (S2) of determining whether the discharge pressure of the compressor 10 is higher than the operation stop pressure based on the data detected from the data detection unit no by the controller 100 during the process (A) described above, if it is determined that the discharge pressure of the compressor 10 is higher than the operation stop pressure (i.e., if the condition is satisfied), the controller 100 may lower the RPMs of the compressor 10 (S7).

Then, the controller 100 determines whether the temperature change rate of the inverter calculated based on the data detected from the data detection unit no is higher than a predetermined change rate (S8).

Here, the predetermined change rate may be set as 1.0° C. per second. That is, the controller 100 determines whether the temperature change rate of the inverter is higher than the predetermined change rate of to 1.0° C./s, thereby determining whether the temperature of the inverter is abnormally increased.

If it is determined that the temperature change rate of the inverter is higher than the predetermined change rate in the step (S8) (i.e., if the condition is satisfied), the controller 100 limits the current value applied to the compressor 10 (S9).

In other words, the controller 100 may limit the current value applied to the compressor 10 when it is determined that the temperature increase of the inverter is abnormal. At this time, the controller 100 limits the current value applied to the compressor 10 to 70% of a maximum current value.

Then, as the current value applied to the compressor 10 decreases, the temperature of the inverter may be prevented from rising.

On the other hand, in the step (S8) in which the controller 100 determines whether the temperature change rate of the inverter calculated based on the data detected from the data detection unit no is higher than the predetermined change rate, if it is determined that the temperature change rate of the inverter is not higher than the predetermined change rate (i.e., the condition is not satisfied), the controller 100 may return to the step (S3) of determining whether the temperature of the inverter is higher than the operation stop temperature in the process (A) and repeat the process (A) as above-described.

On the other hand, when the step (S9) is completed, the controller 100 lowers both the operation stop temperature and the operation release temperature of the inverter (S10).

In the step (S10) of lowering the operation stop temperature and the operation release temperature of the inverter, the controller 100 may initially set the predetermined operation stop temperature of the inverter downward by 10° C. and may initially set the predetermined operation release temperature of the inverter downward by 20° C.

This downward setting may widen a section while lowering a hysteresis section value of the inverter. That is, when the operation stop temperature of the inverter is lowered, the inverter may be protected from thermal impact due to the inertia of the inverter temperature increase.

In addition, when the operation release temperature of the inverter is lowered, it is possible to protect the inverter from thermal damage caused by a thermal energy accumulation in the inverter.

As described above, when the operation stop temperature and the operation release temperature of the inverter are respectively set downward, the controller 100 determines whether the temperature of the inverter is higher than the lowered operation stop temperature (S11).

If it is determined that the temperature of the inverter is higher than the lowered operation stop temperature (i.e., the condition is satisfied), the controller 100 may operate the protection mode.

On the other hand, in the step (S11) in which the controller 100 determines whether the temperature of the inverter is higher than the lowered operation stop temperature, if it is determined that the temperature of the inverter is not higher than the downward operation stop temperature (i.e., if the condition is not satisfied), the controller 100 may return to the step (S7) of lowering the RPMs of the compressor to repeatedly perform each of the above-described steps.

Meanwhile, in the present exemplary embodiment, the protection mode may include the following steps.

First, when the protection mode is operated, the controller 100 stops the operation of the compressor 10 (S12).

When the operation of the compressor 10 is stopped, the controller 100 counts the operation stopping number of the compressor 10 (S13).

Then, the controller 100 determines whether the operation stopping number of the compressor 10 counted while performing the above-described processes (A) and (B) is the same as a predetermined number K (S14). The predetermined number K may be three.

Here, when it is determined that the operation stopping number of the compressor 10 is equal to the predetermined number K (i.e., if the condition is satisfied), the controller 100 stops the operation of the compressor 10 and generates an error code (S15).

When the operation of the compressor 10 is stopped by the controller 100 in the step (S15), the restart of the compressor 10 is stopped. At the same time, the controller 100 generates an error code so that the driver or user may check the operation stop and the restart stop of the compressor 10, and it may be displayed on an instrument panel or a display device provided in the vehicle.

Here, the step (S15) in which the operation of the compressor 10 is stopped and the error code is generated may be reset when a key is turned off at the end of the vehicle operation.

On the other hand, if it is determined that the operation stopping number of the compressor 10 is not equal to the predetermined number K (i.e., if the condition is not satisfied), the controller 100 determines whether the temperature of the inverter is lower than the lowered operation release temperature (S16).

If it is determined that the temperature of the inverter is lower than the lowered operation release temperature in the step (S16) (i.e., if the condition is satisfied), the controller 100 restarts the compressor 10 (S17).

If the step (S17) of restarting the compressor 10 is completed, the controller 100 returns to the step (S7) of lowering the RPMs of the compressor 10 to repeatedly perform each of the above-described steps.

On the other hand, in the step (S16) in which the controller 100 determines whether the temperature of the inverter is lower than the lowered operation release temperature, if it is determined that the temperature of the inverter is not lower than the lowered operation release temperature (i.e., the condition is not satisfied), the controller 100 may be returned to the step S14 of determining whether the counted operation stopping number of the compressor 10 is equal to the predetermined number K, and each of the above-described steps may be repeated.

In this way, in the compressor control method, the process (A) and the process (B) may be reset when the operation of the vehicle is terminated.

Here, the reset means that the operation stop temperature and the operation release temperature of the inverter that were set to be lowered in the process (B) described above are restored to their initial values, respectively.

That is, while repeating each step as described above, the controller 100 minimizes a thermal shock applied to the inverter, and minimizes thermal damage and thermal stress due to the accumulation of the thermal shock, thereby it is possible to prevent a permanent burnout of the inverter in advance, and prevent a permanent failure and damage of the compressor 10.

Therefore, when the compressor control method for the vehicle according to an exemplary embodiment of the present invention configured as described above is applied, by preventing the thermal damage from occurring in the inverter provided in the compressor 10 operated to cool or heat the interior of the electric vehicle, it is possible to prevent the failure and damage of the compressor 10 in advance.

In addition, embodiments of the present invention prevent the accumulation of heat damage and heat stress of the inverter when it is difficult to secure a sufficient flow rate of refrigerant, thereby preventing the permanent damage and failure of the compressor 10 in advance.

Furthermore, embodiments of the present invention may improve the durability and lifespan of the compressor 10 and reduce maintenance costs.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method for controlling a compressor of a vehicle, the method comprising:
    selectively controlling an operation of the compressor by determining and comparing a discharge pressure of the compressor and a temperature of an inverter with predetermined values based on data detected in real time when the compressor is operated to cool or heat an interior of the vehicle; and
    operating a protection mode to prevent thermal burnout of the inverter in response to a determination that the discharge pressure of the compressor is higher than an operation stop pressure;
    wherein selectively controlling the operation of the compressor comprises:
        driving the compressor according to an indoor cooling or heating demand of the vehicle;
        determining whether the discharge pressure of the compressor is higher than the operation stop pressure based on the data detected in real time;
        determining whether the temperature of the inverter is higher than an operation stop temperature in response to a determination that the discharge pressure of the compressor is not higher than the operation stop pressure; and
        stopping the operation of the compressor in response to a determination that the temperature of the inverter is higher than the operation stop temperature;
    wherein selectively controlling the operation of the compressor further comprises:
        determining whether the discharge pressure of the compressor is lower than an operation release pressure and whether the temperature of the inverter is lower than an operation release temperature when the operation of the compressor is stopped; and
        restarting the compressor in response to a determination that the discharge pressure of the compressor is lower than the operation release pressure and the temperature of the inverter is lower than the operation release temperature; and
    wherein operating the protection mode comprises:
        lowering revolutions per minute (RPMs) of the compressor in response to a determination that the discharge pressure of the compressor is higher than the operation stop pressure;
        determining whether a temperature change rate of the inverter calculated based on the data detected in real time is higher than a predetermined change rate;
        limiting a current value applied to the compressor in response to a determination that the temperature change rate of the inverter is higher than the predetermined change rate;
        lowering the operation stop temperature and the operation release temperature of the inverter;
        determining whether the temperature of the inverter is higher than the lowered operation stop temperature; and
        operating the protection mode in response to a determination that the temperature of the inverter is higher than the lowered operation stop temperature.

2. The method of claim 1, wherein, in response to a determination that the discharge pressure of the compressor is not lower than the operation release pressure or the temperature of the inverter is not lower than the operation release temperature, the method further comprises stopping the operation of the compressor again.

3. The method of claim 1, wherein, after restarting the compressor is completed, the method further comprises re-determining whether the discharge pressure of the compressor is higher than the operation stop pressure based on the data detected in real time.

4. The method of claim 1, wherein operating the protection mode further comprises:
    stopping the operation of the compressor;
    counting an operation stopping number of the compressor;
    determining whether the counted operation stopping number of the compressor is equal to a predetermined number; and
    stopping the operation of the compressor and generating an error code in response to a determination that the operation stopping number of the compressor is equal to the predetermined number.

5. The method of claim 4, wherein operating the protection mode further comprises:
    determining whether the temperature of the inverter is lower than the lowered operation release temperature in response to a determination that the operation stopping number of the compressor is not equal to the predetermined number; and
    restarting the compressor in response to a determination that the temperature of the inverter is lower than the lowered operation release temperature.

6. The method of claim 5, wherein, in response to a determination that the temperature of the inverter is not lower than the lowered operation release temperature, the method further comprises re-determining whether the counted operation stopping number of the compressor is equal to the predetermined number.

7. The method of claim 5, wherein, after restarting the compressor is completed, the method further comprises repeating lowering the RPMs of the compressor.

8. The method of claim 4, wherein the predetermined number is three.

9. The method of claim 1, wherein, in response to a determination that the temperature change rate of the inverter is not higher than the predetermined change rate, the method further comprises re-determining whether the temperature of the inverter is higher than the operation stop temperature.

10. The method of claim 1, wherein, in response to a determination that the temperature of the inverter is not higher than the lowered operation stop temperature, the method further comprises repeating lowering the RPMs of the compressor.

11. The method of claim 1, wherein lowering the operation stop temperature of the inverter and the operation release temperature comprises setting an initially predetermined operation stop temperature of the inverter to be lowered by 10° C. and setting an initially predetermined operation release temperature of the inverter to be lowered by 20° C.

12. The method of claim 1, further comprising using a data detector to collect the data in real time, wherein the data detector comprises:
   a pressure sensor measuring the discharge pressure of the compressor; and
   a temperature sensor measuring the temperature of the inverter.

13. A method for controlling a compressor of a vehicle, the method comprising:
   selectively controlling an operation of the compressor by determining and comparing a discharge pressure of the compressor and a temperature of an inverter with predetermined values based on data detected in real time when the compressor is operated to cool or heat an interior of the vehicle; and
   operating a protection mode to prevent thermal burnout of the inverter in response to a determination that the discharge pressure of the compressor is higher than an operation stop pressure;
   wherein selectively controlling the operation of the compressor comprises:
      driving the compressor according to an indoor cooling or heating demand of the vehicle;
      determining whether the discharge pressure of the compressor is higher than the operation stop pressure based on the data detected in real time;
      determining whether the temperature of the inverter is higher than an operation stop temperature in response to a determination that the discharge pressure of the compressor is not higher than the operation stop pressure; and
      stopping the operation of the compressor in response to a determination that the temperature of the inverter is higher than the operation stop temperature;
   wherein selectively controlling the operation of the compressor further comprises:
      determining whether the discharge pressure of the compressor is lower than an operation release pressure and whether the temperature of the inverter is lower than an operation release temperature when the operation of the compressor is stopped; and
      restarting the compressor in response to a determination that the discharge pressure of the compressor is lower than the operation release pressure and the temperature of the inverter is lower than the operation release temperature;
   wherein operating the protection mode comprises:
      lowering revolutions per minute (RPMs) of the compressor in response to a determination that the discharge pressure of the compressor is higher than the operation stop pressure;
      determining whether a temperature change rate of the inverter calculated based on the data detected in real time is higher than a predetermined change rate;
      limiting a current value applied to the compressor in response to a determination that the temperature change rate of the inverter is higher than the predetermined change rate;
      lowering the operation stop temperature and the operation release temperature of the inverter;
      determining whether the temperature of the inverter is higher than the lowered operation stop temperature; and
      operating the protection mode in response to a determination that the temperature of the inverter is higher than the lowered operation stop temperature; and
   wherein the method is reset in response to driving of the vehicle being terminated.

14. The method of claim 13, wherein, in response to a determination that the discharge pressure of the compressor is not lower than the operation release pressure or the temperature of the inverter is not lower than the operation release temperature, the method further comprises stopping the operation of the compressor again.

15. The method of claim 13, wherein, after restarting the compressor is completed, the method further comprises re-determining whether the discharge pressure of the compressor is higher than the operation stop pressure based on the data detected in real time.

16. The method of claim 13, wherein operating the protection mode further comprises:
   stopping the operation of the compressor;
   counting an operation stopping number of the compressor;
   determining whether the counted operation stopping number of the compressor is equal to a predetermined number; and
   stopping the operation of the compressor and generating an error code in response to a determination that the operation stopping number of the compressor is equal to the predetermined number.

17. The method of claim 16, wherein operating the protection mode further comprises:
   determining whether the temperature of the inverter is lower than the lowered operation release temperature in response to a determination that the operation stopping number of the compressor is not equal to the predetermined number; and
   restarting the compressor in response to a determination that the temperature of the inverter is lower than the lowered operation release temperature.

18. The method of claim 17, wherein, in response to a determination that the temperature of the inverter is not lower than the lowered operation release temperature, the method further comprises re-determining whether the counted operation stopping number of the compressor is equal to the predetermined number.

19. The method of claim 17, wherein, after restarting the compressor is completed, the method further comprises repeating lowering the RPMs of the compressor.

20. The method of claim 16, wherein the predetermined number is three.

* * * * *